(12) United States Patent
Farison et al.

(10) Patent No.: US 9,934,508 B2
(45) Date of Patent: Apr. 3, 2018

(54) MECHANISM FOR VERIFYING THE AUTHENTICITY OF A PRODUCT

(71) Applicant: STMicroelectronics (Rousset) SAS, Rousset (FR)

(72) Inventors: Denis Farison, Le Tholonet (FR); Fabrice Romain, Rians (FR); Christophe Laurencin, Peypin (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 951 days.

(21) Appl. No.: 14/305,070

(22) Filed: Jun. 16, 2014

(65) Prior Publication Data
US 2014/0372327 A1    Dec. 18, 2014

(30) Foreign Application Priority Data

Jun. 18, 2013    (FR) ..................... 13 55727

(51) Int. Cl.
| | | |
|---|---|---|
| H04L 29/06 | (2006.01) | |
| G06Q 30/00 | (2012.01) | |
| G06F 21/44 | (2013.01) | |

(52) U.S. Cl.
CPC .......... *G06Q 30/018* (2013.01); *G06F 21/44* (2013.01)

(58) Field of Classification Search
CPC ................. G06Q 30/18; G06F 21/44
See application file for complete search history.

(56) References Cited

U.S. PATENT DOCUMENTS

| 8,386,781 | B2 | 2/2013 | Cho et al. |
| 2007/0079125 | A1 | 4/2007 | Adkins et al. |
| 2008/0094220 | A1 | 4/2008 | Foley et al. |
| 2011/0138192 | A1* | 6/2011 | Kocher ............... G06F 21/602 713/189 |
| 2011/0246756 | A1* | 10/2011 | Smith ................. H04L 9/3252 713/2 |
| 2014/0006738 | A1* | 1/2014 | Nagai ................... G06F 21/78 711/163 |
| 2014/0367465 | A1* | 12/2014 | Farison ............... G06Q 30/018 235/382 |
| 2016/0094533 | A1* | 3/2016 | Bucci .................. H04L 63/08 726/7 |
| 2017/0004333 | A1* | 1/2017 | Modave ................ G06F 21/73 |

OTHER PUBLICATIONS

INPI Search Report and Written Opinion for FR 1355727 dated Oct. 31, 2013 (7 pages).

* cited by examiner

*Primary Examiner* — Sarah Su
(74) *Attorney, Agent, or Firm* — Gardere Wynne Sewell LLP

(57) ABSTRACT

The authenticity of a product associated with a host device is verified through a process. The product contains, in segments of a non-volatile memory, several different functions stored in ciphered fashion. The process involves, in a first phase, the sending by the host device of a control signal for executing a function, with the product functioning to decipher the function and store the unciphered function in the non-volatile memory. The process further involves, in a second phase, the sending by the host device of a control signal for causing execution of the deciphered function, with the product functioning to execute the function and send a result of this execution back to the host device. The host device evaluates the received result to verify product authenticity.

20 Claims, 2 Drawing Sheets

MECHANISM FOR VERIFYING THE AUTHENTICITY OF A PRODUCT

PRIORITY CLAIM

This application claims the priority benefit of French Patent Application number 1355727, filed on Jun. 18, 2013, the disclosure of which is hereby incorporated by reference in its entirety to the maximum extent allowable by law.

TECHNICAL FIELD

The present disclosure generally relates to electronic circuits and, more specifically, to a method for verifying the authenticity or the origin of a product (an accessory or a consumable) intended to cooperate with a device.

BACKGROUND

In many fields, it is desired to guarantee that a product, for example, an ink cartridge, a battery, an accessory, etc., to be used in a device, is an original or authentic product, that is, a product approved by the device manufacturer. To achieve this, an authentication key is generally stored in an electronic circuit associated with this product and is used, when the product is installed in the device or when it should cooperate therewith, to verify that the product is authentic.

However, if the secret can be discovered and a manufacturer commercializes products which are not approved by the device manufacturer, but are however equipped with circuits having the right key, the devices will consider these products as authentic.

SUMMARY

An embodiment of the present disclosure relates to a technique for verifying the authenticity of a product, which overcomes all or part of the disadvantages of existing solutions.

Another embodiment of the present disclosure enables to block the use of batches of non-authentic products without for all this preventing the use of authentic products of same generation.

An embodiment provides a method for verifying the authenticity of a product associated with a host device, wherein the product contains, in segments of a non-volatile memory, several different functions stored in ciphered fashion, wherein: in a first phase: the host device sends a control signal for executing a function; the product deciphers the function and stores it unciphered in the non-volatile memory; and in a second phase: the host device sends a control signal for executing the deciphered function; the product executes the function and sends a result of this execution to the host device.

According to an embodiment, a key for deciphering the segment containing the function is contained in the activation control signal sent by the host device.

According to an embodiment, the host device verifies the result to authenticate the product.

According to an embodiment, the first phase is only implemented once per product.

According to an embodiment, the second phase is implemented on each use of the product by the device.

According to an embodiment, the host device contains one function identifier only.

According to an embodiment, said segments are stored on manufacturing of the product.

According to an embodiment, different versions of devices activate different functions of a same type of products.

According to an embodiment, a system comprising at least one host device and at least one product associated with this host device is also provided.

According to an embodiment, the devices are printers and the products are ink cartridges.

BRIEF DESCRIPTION OF THE DRAWINGS

The foregoing and other features and advantages will be discussed in detail in the following non-limiting description of specific embodiments in connection with the accompanying drawings, wherein.

DETAILED DESCRIPTION OF THE DRAWINGS

Figure 1:
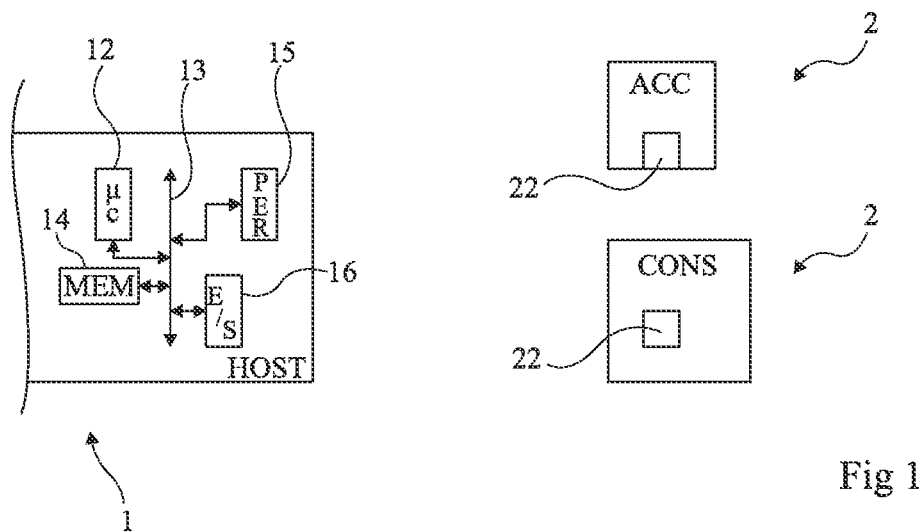
FIG. 1 very schematically shows in the form of blocks an example of a system of the type to which the present disclosure applies as an example.

The same elements have been designated with the same reference numerals in the different drawings. For clarity, only those steps and elements which are useful to the understanding of the embodiments which will be described have been shown and will be detailed. In particular, the cryptographic ciphering and deciphering processes capable of being used in data exchanges between a device and its accessories or consumables have not been detailed, the described embodiments being compatible with usual processes.

FIG. 1 very schematically shows, in the form of blocks, an example of a system of the type to which the embodiments which will be described apply.

A host device 1 is capable of receiving or of operating with one or several products 2, accessories (ACC), or consumables (CONS).

As a specific example of application, the host device is a printer and the product (consumable) is an ink cartridge. According to another example, it is an electronic system (for example, a game console, a cell phone, etc.) using accessories (for example, game pads, earphones, a hull, a case, etc.). More generally, it may be any type of system based on the cooperation between a main device and one or several accessories or consumables.

Although reference will be made hereafter to the example of a printer and of its ink cartridges, all that will be described transposes, unless otherwise mentioned, to the other systems.

Printer manufacturers are generally looking for a protection against the use of counterfeit or non-authentic cartridges in order, among other things, to guarantee the quality and the reliability of the original cartridges with respect to copies or "clones" for their users. Another object is to avoid possible counterfeits. Reference will be made hereafter to copies to designate non-authentic products, be they slavish imitations or more generally similar products capable of being used to replace authentic products.

The protection generally comprises a mechanism of authentication of a new cartridge introduced into the printer, or even an authentication on each powering-on of the printer, on each leaving of the stand-by mode, or on each printing (on each use of the product). The printer and each cartridge are equipped with an electronic circuit adapted to such an authentication, for example, a cryptographic processor or a program executed by a generic processor. Keys are present on the printer side and on the cartridge side.

For example, as illustrated in FIG. 1, printer 1 comprises a microcontroller-type circuit 12 (μC) capable of communicating over one or several address, control, and data buses 13, with one or several memories 14, one or several peripherals 15 (PER), for example, the various circuits of the printer, and one or several input-output circuits 16 (E/S), among which a device capable of communicating with cartridges 2.

An ink cartridge 2 comprises at least one secure circuit 22 for example, of microcontroller type, comprising the same type of components (not shown): a processor, volatile and non-volatile memories, an input-output interface towards a bus of communication with the printer, etc.

Generally, at the manufacturing, an authentication key formed of a data word is stored in a secure memory of circuit 22. When the cartridge is paired up with the printer, the latter starts an authentication procedure based on this key. To be recognized, all cartridges compatible with a given printer should have a key enabling to authenticate itself with this printer, possible originating from a key derivation mechanism.

Such a mechanism becomes inefficient if the key of a series of cartridges is discovered. In such a case, copies are capable of being manufactured with an authentication method using the right key and the printer will be unable to discriminate them from the original cartridges.

A current solution for printer manufacturers is to change the printer model to change the cartridge type. Indeed, it cannot be envisaged to program a new key in a new batch of printers and to change the cartridge key, since printers already in circulation could then no longer operate with the new cartridges.

Actually, it becomes impossible to revoke a key shared between a printer and a cartridge type, the only solution being to forbid printers already in circulation to use the new cartridges. This would then force these printers to only use copies, which is precisely what is desired to be avoided.

According to the present disclosure, it is provided to store in ciphered fashion, in a memory of the circuit associated with the cartridges, several segments of one or several instructions capable of being used by a processor of the cartridge, each segment being ciphered with a different key. The stored instructions are selected to execute a different function from one segment or sub-program to another. Further, the storage is made in the form of opcodes and of operands directly interpretable by the cartridge processor. The keys for encrypting the segments are unknown by the cartridge. They are not stored therein.

Figure 2:
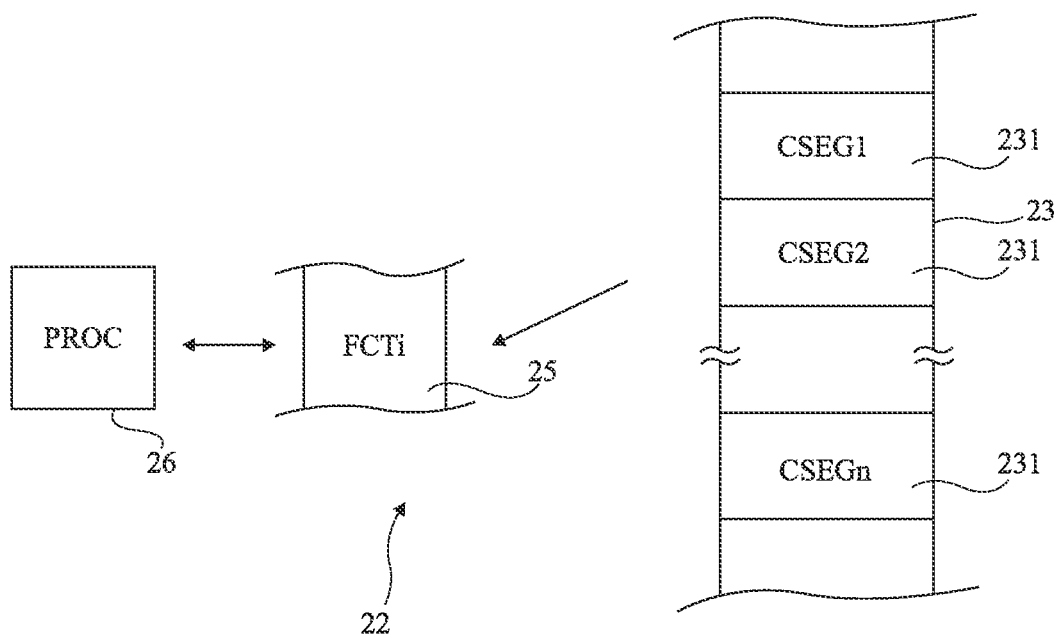
FIG. 2 illustrates an example of storage on the side of the product to be authenticated.

FIG. 2 illustrates an embodiment of such a method. A memory 23 of secure circuit 22 of a cartridge comprises several instruction segments 231 (CSEG 1, CSEG2, . . . , CSEGn). Each segment contains at least one opcode and, possibly, all or part of the arguments (operands) of the function to be executed. Each segment may contain several opcodes according to the function that it represents. Certain opcodes may be present in different segments (for example, data reading), provided for the segment function to be different.

Figure 3:
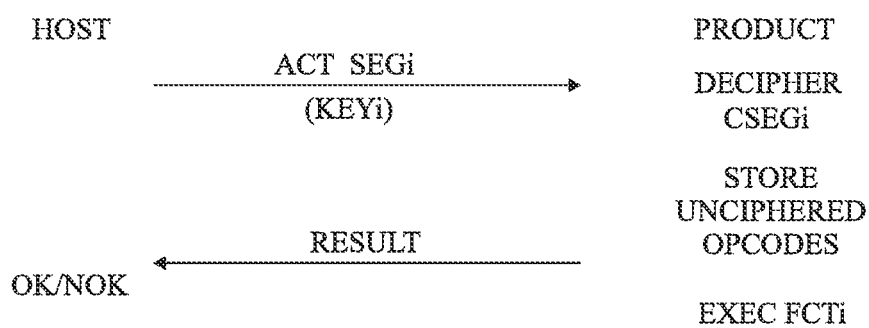
FIG. 3 very schematically illustrates an embodiment of the method of authentication of a product by a device.

FIG. 3 illustrates an embodiment of the method for verifying the authenticity of a cartridge.

On introduction of a new cartridge (PRODUCT), the printer (HOST) detects it and sends an activation control signal to the cartridge (ACT). The control signal contains an identifier of a segment 231 (SEGi) to be decoded as well as the corresponding deciphering key (KEYi). According to the mode of ciphering of the used exchanges, part of the key may be contained in the cartridge, or a key for ciphering the exchanges is contained in the cartridge and is used for the transfer of deciphering key KEYi of the segment.

The cartridge (its microprocessor) uses the key transmitted by the printer to decipher the identified segment. Then, the codes of this segment are stored in non-ciphered fashion (STORE UNCIPHERED OPCODES) in a memory (25, FIG. 2) or in an area of memory 23, accessible by processor 26 (PROC) of circuit 22, so that function FCTi contained in the deciphered segment can be executed (EXEC FCTi).

Once the function has been executed by the microprocessor, one or several results (RESULT) are sent by the cartridge to the printer to verify the authenticity.

The printer then verifies whether the result is in accordance with what it expects and determines whether the cartridge is authentic or not (OK/NOK). The procedure in the case of a non-authentic cartridge is usual (printer blocking, error message, etc.).

Figure 4:
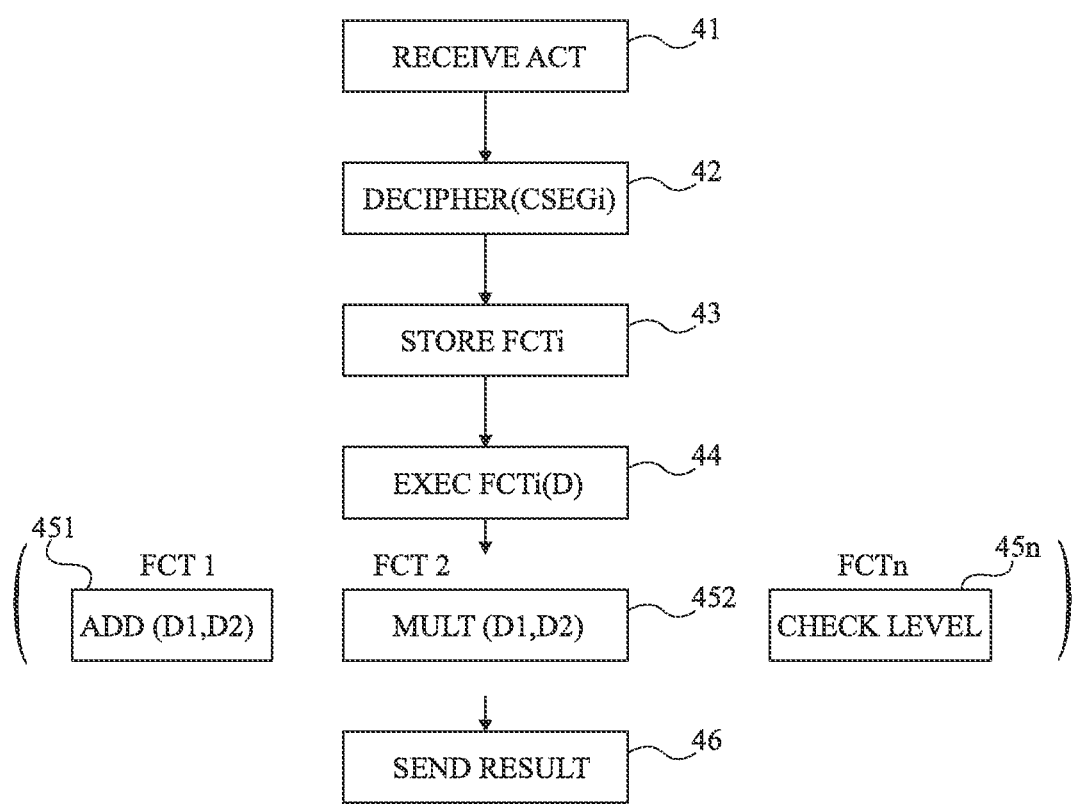
FIG. 4 illustrates, in the form of blocks, an example of steps implemented by a product.

FIG. 4 illustrates, in the form of blocks, an example of steps implemented by a cartridge during the authentication process.

The cartridge starts by receiving (block 41, RECEIVE ACT) an activation control signal sent by the printer. As indicated hereabove, the electronic circuit of the cartridge deciphers (block 42, DECIPHER(CSEGi)) the memory segment corresponding to the identifier sent by the printer. This identifier is, for example, the beginning address of the segment in memory 23 or the address range of the segment in this memory. As a variation, the cartridge contains a look-up table linking the identifiers (for example, numbers) of the segments to their addresses in memory 23.

Function FCTi contained in the segment is, once deciphered, stored in non-ciphered fashion (block 43, STORE FCTi), for example, in memory 25. Memory 25 is not necessarily a non-volatile memory. It may indeed be provided for the function not to be a permanent function added for the new printer version, but only a function used to verify the authenticity on installing of the cartridge or on each initialization (starting or leaving of the printer stand-by mode). In this case, it is not necessary to store the function in a non-volatile memory, the printer sending an activation control signal causing the deciphering of segment CSEGi every time. An advantage of only storing FCTi in a volatile memory is that this further complicate the pirate's task.

Once the function has been deciphered, it is executed (block 44, EXEC FCTi(D)) by the cartridge circuit. According to the nature of the function, said function uses or not an operand D provided by the printer. The nature of the function may be purely for control purposes (arithmetic operation, for example) or to exploit information of the cartridge or of the printer. FIG. 4 illustrates three arbitrary examples of functions having their respective results expected by printers sending the corresponding activation control signals: a first function FCT1 sum up two data D1 and D2 (block 451, ADD(D1, D2)), data D1 and D2 being for example, for one of them, contained in the activation control signal and, for the other, contained in segment CSEG1; a second function FCT2 multiplies two data D1 and D2 (block 452, MULT (D1, D2 )); an n-th function FCTn checks the cartridge ink level (block 45n, CHECK LEVEL). The cartridge sends the result of the function to the printer (block 46, SEND RESULT), which validates or invalidates this result and allows or not the operation. Whatever the function, the printer knows either the result of an operation that it expects, or the nature of the information to be communicated thereto by the cartridge.

According to a first aspect, the activation control signal is sent each time an authentication is needed. It can be considered that the activation control signal includes the execution control signal. The segment is then deciphered each time it should be used. In this case, a storage in a non-volatile memory of the deciphered segment is not necessary since the corresponding function is only used once on each deciphering.

According to a second aspect, the function is, in a first phase, deciphered at the cartridge installation (once per product) and is then stored in non-ciphered fashion in the non-volatile memory of the cartridge. The printer may, in a second phase, implement an authentication procedure, for example, on each leaving of the stand-by mode or on each printing, by sending a control signal for executing the function (possibly, with different arguments from one time to the other).

According to an alternative embodiment, the segments also contain a key capable of being used by the cartridge to then cipher its exchanges with the printer. Such a ciphering is usual per se.

On design of a cartridge type, the printer manufacturer selects a number n of functions FCT to be integrated in ciphered fashion in the cartridge memory. The higher this number, the more it then has the possibility of blocking successive versions of non-authentic cartridges, but the more space this takes in the non-volatile memory of the cartridge. Indeed, the cartridge contains all the ciphered segments as soon as it is created.

Then, for each printer version compatible with this type of cartridge, the manufacturer has the choice of the function to be activated. Preferably, a given printer only has in memory a control signal for activating a given segment CSEGi. As a variation, the identifier of the new segment may be communicated thereto during a software update.

If the printer manufacturer desires, for a new printer version, to revoke a key used by cartridges currently in circulation, he parameters this new printer version so that it activates a new segment on the cartridges. All authentic cartridges will keep on operating and being compatible with the new version.

However, even if a manufacturer of non-authentic cartridges succeeds in reproducing the key of one of the segments on his own cartridges from a piracy of cartridges in circulation, this will only enable the copies to operate on printers of the version using the corresponding function. Copies will not function on the new printer version, which uses another segment. Thus, non-authentic cartridges, adapted to the first series, will only be adapted to the first printer version. This considerably complicates the task of the pirate manufacturer.

Thus, a manufacturer which finds out the existence of copies may parameterize the new printers so that they activate a different segment of cartridges in circulation. The new printer versions, while being compatible with the same type of cartridges, will wait for a different result of the authentication procedure. Accordingly, already-manufactured non-authentic cartridges will not work with new printers.

Further, the provided mechanism is compatible with an optional update of printers already in circulation, for example, during software modifications. Thus, for printers capable of being updated, for example, from an internet connection via a computer or directly, the manufacturer can cause the segment change.

Assuming that the memory of the authentication circuit of a cartridge is totally pirated, all the ciphered segments are then present in non-authentic circuits. The segments may even be decoded since the key received by the printer will be usable by the copy. However, chances are slight for the program, once decoded, to operate and execute the function having its result expected by the printer. Indeed, non-authentic circuits reproduce the mechanisms of protected exchange with the printer by pirating the encryption algorithms and the keys. However, they do not use the same processor cores as the original products. Accordingly, the deciphered functions will be impossible to execute on the processor of the non-authentic circuit.

Exchanges between the printer and the cartridge may be secured in usual fashion (for example, a symmetrical or asymmetrical ciphering based on keys contained in the cartridge and in the printer, provided for these keys to be different in the ciphering keys of segments 231). However, even with the deciphering key of a segment, a non-authentic cartridge will not operate, unless it has exactly the same microcontroller and exploitation system, which strongly limits risks.

Various embodiments have been described, various alterations and modifications will occur to those skilled in the art. In particular, the selection of the number of segments to be stored in the products (accessories or consumables) depends on the application and on the security level desired in terms of possible depth of change. Further, the selection of the authentication mechanisms also depends on the application. Further, the practical implementation of the described embodiments is within the abilities of those skilled in the art based on the functional indications given hereabove and by using encryption and programming tools usual per se.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for verifying the authenticity of a product associated with a host device, wherein the product contains, in segments of a non-volatile memory, a plurality of different functions, wherein each function is stored in ciphered fashion, wherein the method comprises:
  in a first phase:
    the host device sends a first control signal for requesting activation of a selected function of said plurality of different functions;
    the product, in response to the first control signal, cryptographically deciphers the selected function and stores an unciphered version of the selected function in the non-volatile memory of the product; and
  in a second phase:
    the host device sends a second control signal to the product, the second control signal distinct from the first control signal, for executing the unciphered version of the selected function;
    the product, in response to the second control signal, executes the unciphered version of the selected function and sends a result of this execution to the host device.

2. The method of claim 1, wherein a key for cryptographically deciphering the selected function is contained in the first control signal sent by the host device.

3. The method of claim 1, wherein the host device verifies the result to authenticate the product.

4. The method of claim 1, wherein the first phase is only implemented once per product.

5. The method of claim 1, wherein the second phase is implemented on each use of the product by the device.

6. The method of claim 1, wherein the host device contains one identifier only which identifies the selected function of said plurality of different functions.

7. The method of claim 1, wherein the plurality of different functions are stored in the segments on manufacturing of the product.

8. The method of claim 1, wherein different versions of host devices request activation of different functions of a same type of products.

9. The method of claim 1, wherein each function stored in ciphered fashion includes at least one ciphered opcode, and wherein the unciphered version of the selected function includes at least one unciphered opcode, and wherein execution of the unciphered version of the selected function comprises executing the at least one unciphered opcode.

10. A system, comprising:
a host device; and
a product associated with this host device that stores a plurality of different functions, each function stored in a ciphered fashion;
wherein the host device operates to send to the product a first control signal in a first phase for actuating a selected function of the plurality of functions and send to the product a second control signal in a second phase for executing the selected function, the second control signal being distinct from the first control signal;
wherein the product operates:
in the first phase, in response to the first control signal sent from the host device, to cryptographically decipher the selected function and store an unciphered version of the selected function in a non-volatile memory; and
in the second phase, in response to the second control signal sent from the host device, to execute the unciphered version of the selected function and send a result of this execution to the host device.

11. The system of claim 10, wherein the host device is a printer and the product is an ink cartridge.

12. The system of claim 10, wherein each function stored in ciphered fashion includes at least one ciphered opcode, and wherein the unciphered version of the selected function includes at least one unciphered opcode, and wherein execution of the unciphered version of the selected function comprises executing the at least one unciphered opcode.

13. A method, comprising:
storing in segments of a non-volatile memory of a product a plurality of ciphered functions;
receiving by said product of a first message originated from a device which uses said product, said first message including a cipher key and a segment identifier;
extracting by the product of a selected ciphered function of the plurality of ciphered functions from the segment identified by the segment identifier;
crytographically deciphering by the product of the selected ciphered function using the cipher key to produce an unciphered version of the selected ciphered function;
receiving by said product of a second message originated from the device, the second message having instructions for execution of the unciphered version of the selected ciphered function;
executing, in response to the second message, the unciphered version of the selected ciphered function; and
sending a result of the execution in a message back to said device.

14. The method of claim 13, further comprising verifying by said device of the result and permitting the device to use said product.

15. The method of claim 13, further comprising storing by said product of the deciphered function.

16. The method of claim 15, wherein storing is executed only one time by said product.

17. The method of claim 16, wherein executing and sending are executed by said product each time the product is provided for use by said device.

18. The method of claim 13, wherein each ciphered function includes at least one ciphered opcode, and wherein the unciphered version of the selected ciphered function includes at least one unciphered opcode, and wherein executing comprises executing the at least one unciphered opcode.

19. A method for verifying the authenticity of a product connected to and to be used with a host device, wherein the product contains, stored in a non-volatile memory, a plurality of different cryptographically ciphered instruction segments, each cryptographically ciphered instruction segment including at least one ciphered opcode, the method comprising:
receiving by the product of a first control signal sent by the host device, said first control signal requesting activation of a selected cryptographically ciphered instruction segment of said plurality of different cryptographically ciphered instruction segments;
cryptographically deciphering by the product of the selected cryptographically ciphered instruction segment to obtain at least one unciphered opcode;
receiving by the product of a second control signal sent by the host device, said second control signal requesting execution of the cryptographically deciphered selected cryptographically ciphered instruction segment;
executing by a processor of the product the at least one unciphered opcode of the selected cryptographically ciphered instruction segment that was cryptographically deciphered, said executing generating a result; and
sending by the product of said result to the host device.

20. A system, comprising:
a host device; and
a product associated with this host device that stores a plurality of different cryptographically ciphered instruction segments, each cryptographically ciphered instruction segment including at least one ciphered opcode;
wherein the host device operates to send to the product a first control signal in a first phase for actuating a selected ciphered instruction segment and send to the product a second control signal in a second phase for executing the selected ciphered instruction segment, the second control signal being distinct from the first control signal;
wherein the product operates:
in the first phase, in response to the first control signal sent from the host device, to cryptographically decipher the selected ciphered instruction segment and store at least one unciphered opcode in a non-volatile memory; and in the second phase, in response to the second control signal sent from the host device, to execute the at least one unciphered opcode and send a result of this execution to the host device.

\* \* \* \* \*